United States Patent
Breslau et al.

(10) Patent No.: US 8,165,019 B2
(45) Date of Patent: Apr. 24, 2012

(54) INDIRECT MEASUREMENT METHODOLOGY TO INFER ROUTING CHANGES USING STATISTICS OF FLOW ARRIVAL PROCESSES

(75) Inventors: Lee Breslau, Basking Ridge, NJ (US); Amogh Dhamdhere, La Jolla, CA (US); Nicholas Duffield, Summit, NJ (US); Cheng Ee, Rockaway, NJ (US); Alexandre Gerber, Madison, NJ (US); Carsten Lund, Berkeley Heights, NJ (US); Subhabrata Sen, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 65 days.

(21) Appl. No.: 12/460,113

(22) Filed: Jul. 14, 2009

(65) Prior Publication Data

US 2011/0013525 A1  Jan. 20, 2011

(51) Int. Cl.
*H04L 12/26* (2006.01)
*H04L 12/56* (2006.01)

(52) U.S. Cl. .................................. 370/229; 370/237
(58) Field of Classification Search .................. None
See application file for complete search history.

(56) References Cited

U.S. PATENT DOCUMENTS

| | | | |
|---|---|---|---|
| 7,023,979 B1 * | 4/2006 | Wu et al. | 379/265.11 |
| 7,299,277 B1 * | 11/2007 | Moran et al. | 709/224 |
| 7,478,156 B1 * | 1/2009 | Pereira | 709/224 |
| 7,743,134 B2 * | 6/2010 | Kohler et al. | 709/224 |
| 2006/0182118 A1 * | 8/2006 | Lam et al. | 370/395.42 |
| 2008/0115221 A1 * | 5/2008 | Yun et al. | 726/25 |
| 2008/0281607 A1 * | 11/2008 | Sajja et al. | 705/1 |
| 2010/0091676 A1 * | 4/2010 | Moran et al. | 370/252 |
| 2010/0257580 A1 * | 10/2010 | Zhao | 726/1 |

* cited by examiner

*Primary Examiner* — Chi H Pham
*Assistant Examiner* — Soon-Dong Hyun

(57) ABSTRACT

Statistical methods are used to observe packet flow arrival processes and to infer routing changes from those observations. Packet flow arrivals are monitored using NetFlow or another packet flow monitoring arrangement. Packet flow arrivals are quantified by counting arrivals per unit time, or by measuring an inter-arrival time between flows. When a change in packet flow arrivals is determined to be statistically significant, a change in network routing protocol is reported.

20 Claims, 3 Drawing Sheets

INDIRECT MEASUREMENT METHODOLOGY TO INFER ROUTING CHANGES USING STATISTICS OF FLOW ARRIVAL PROCESSES

FIELD OF THE DISCLOSURE

The present invention relates generally to the detection and measurement of routing changes in a packet switched network. More particularly, the present application relates to inferring network routing changes from the observation of packet flows.

BACKGROUND

In a packet switched network, routing protocols determine the path that packets traverse through the network. Those routing protocols react to changes in the network (e.g., links going up and down, or link costs changing) and adjust the routes taken by packets through the network.

The routing protocols are often distributed, in that they are implemented in a coordinated fashion by many routers in the network, and they are dynamic, in that they react to changes in the network. As such, the routes taken by packets will change over time, often in unanticipated ways.

In such a network, it is important to understand the nature of routing changes, as these changes impact the stability of the network and the level of service (i.e., loss and delay) experienced by packets.

Network operators and service providers have invested a great deal in understanding the dynamics and stability of routing within their networks. Previous approaches include:

1. Monitoring of routing protocol message exchanges by specialized route monitors. These messages can then be used to infer the state of routing in the network.
2. Monitoring of router log messages that identify when events (e.g., link failures) have occurred.
3. Active end-to-end measurement of the data plane to infer the stability and performance of the network.

The first two approaches measure the control plane directly but are unable to give precise information about the control plane on short timescales and on all routers. That is, those approaches can identify that changes have occurred, but they can neither precisely assess the impact of those changes nor can they necessarily determine when the impact was experienced at each individual router.

The third approach measures the impact of routing changes on the data plane, but again, only in a coarse and imprecise manner.

There is therefore a need for an improved method for detecting and measuring routing changes in a packet-switched network.

SUMMARY

The present invention addresses the needs described above by providing a method for detecting routing changes in a packet-switched network. In a packet flow analyzer connected to a router, packet flows traversing the router are monitored, wherein all packets of a packet flow are destined for the same destination. In a computer connected for receiving data generated by the monitoring of the packet flows, it is statistically determined that a frequency of packet flows traversing a particular interface of the router has changed. Based on a determination that the frequency of packet flows traversing the particular interface of the router has changed, the routing change in the packet-switched network is reported.

The step of monitoring packet flows traversing the router may include monitoring packets arriving at a particular incoming interface, or may include monitoring packets departing over a particular outgoing interface. The step of monitoring packet flows may comprise recording an observation time of a first packet of each monitored packet flow. An interface traversed by each monitored packet flow may also be recorded.

The step of monitoring packet flows traversing the router may further comprise recording a number of packet flows traversing the router during each of a plurality of time bins, or may comprise recording flow inter-arrival times between sequential packet flows traversing the router.

The destination to which all packets of a packet flow are destined may comprise a destination selected from the group consisting of an IP destination address, an IP subnet and a network aggregate. All packets of a packet flow may have in common a source address and a destination address.

The method may additionally include the steps of repeating the monitoring and determining steps in association with a packet flow analyzer connected to a second router; and determining an impact of the change in routing protocol on the packet-switched network.

Another embodiment of the invention is a computer-usable medium having computer readable instructions stored thereon for execution by a processor to perform the above-described method for detecting a change in routing protocol in a packet-switched network.

DESCRIPTION

In a packet switched network such as the Internet, routing protocols are implemented in the control plane. Those routing protocols determine the path that packets traverse through the network. The inventors have discovered a method to infer changes in the network control plane using passive measurements of the data plane.

The method of the present invention leverages existing passive measurement techniques on routers. In an exemplary embodiment, measurements provided by the NetFlow measurement platform are used. A router having the NetFlow feature enabled generates NetFlow records that contain a wide variety of information about the traffic in a given flow. While this disclosure refers to a NetFlow monitoring system, it is understood that any other packet flow monitoring system may be used without departing from the invention.

The disclosed technique is an indirect approach, as opposed to a direct determination of routing changes. A direct approach uses the incoming and outgoing interfaces in NetFlow records to infer routing table entries in routers. A direct approach detects routing changes by detecting NetFlow records to the same destination that indicate different routing table entries were used to make forwarding decisions. In contrast, the indirect approach of the present disclosure utilizes statistical properties of flow arrival (or departure) processes at routers and determines changes in those processes to infer routing changes. Such indirect inferences are very useful in many situations. In some cases they will detect routing changes that the direct method will miss, and they will in general require less processing and storage overhead than the direct method.

Figure 1:
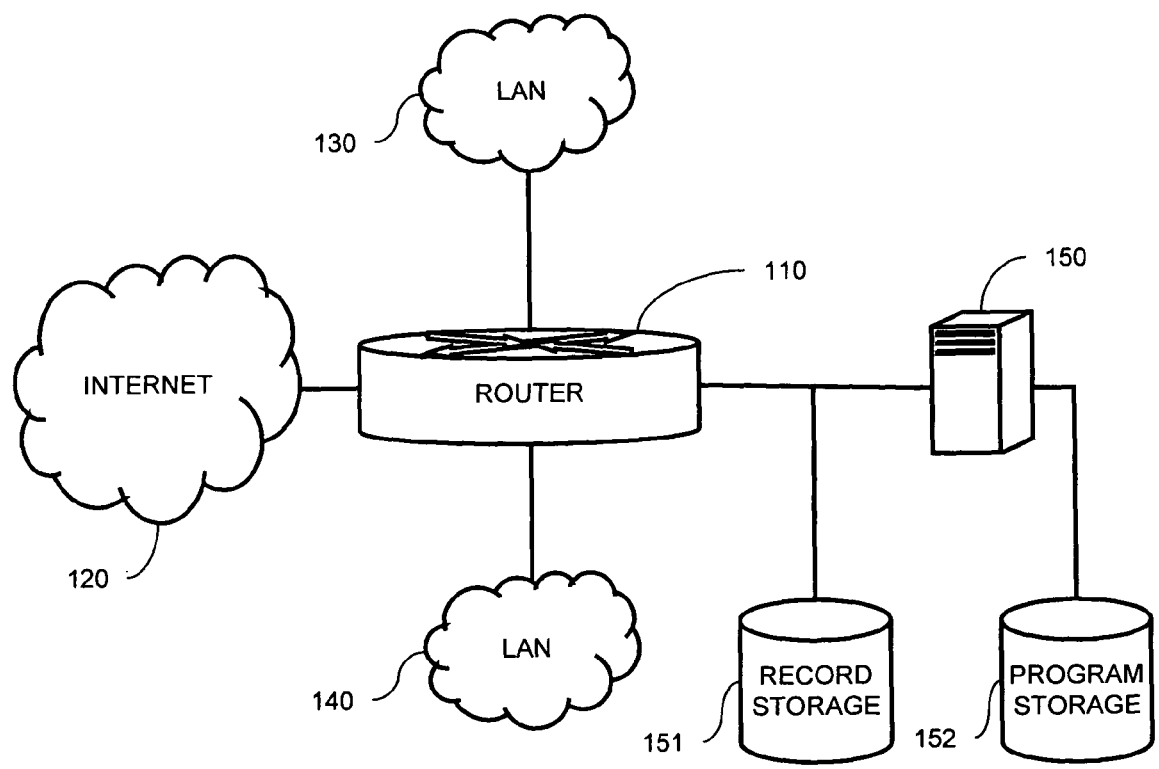
FIG. 1 is schematic diagram of a network, according to one embodiment of the invention.

A packet-switched network including elements in accordance with the invention is shown in FIG. 1. A router 110 interconnects a network such as the Internet 120 with other networks such as local area networks (LANs) 130, 140. The router may alternatively interconnect several portions or elements within the Internet or within another packet-switched network.

A monitoring computer 150 is connected to the router 110 and receives packet flow monitoring records from the router. In the case of a NetFlow-enabled router, the computer 150 receives NetFlow records. The packet flow monitoring records are stored on a computer readable medium 151 such as a disk drive, accessible to the computer 150. The router 110 may forward the packet flow monitoring records directly to the storage medium 151, or the records may be forwarded to the computer 150, which stores the records on the medium 151.

Method steps for execution by a processor in the computer 150 are stored on computer-usable medium 152 as computer readable instructions. The router 110 may similarly contain media with computer readable instructions for executing process steps.

The Netflow-enabled router (or otherwise packet flow monitoring-enabled router) 110 collects and stores flow records for some (in the case where sampling is enabled) or all (without sampling enabled) traffic traversing a router in the network. The traffic reported by the router is aggregated into packet flows. In general, packet flows comprise traffic to/from the same network endpoints and belonging to the same application level connection. A packet flow may be defined in accordance with the reasons for collecting the packet flow data. For example, a packet flow may be defined as a group of packets sharing some or all of the following characteristics:

Source IP address
Destination IP address
Source port for UDP or TCP, 0 for other protocols
Destination port for UDP or TCP, type and code for ICMP, or 0 for other protocols
IP protocol
Ingress interface
IP Type of Service.

Other traffic characteristics may also be used in defining packet flows.

A packet flow monitoring-enabled router stores information about each detected packet flow in a record. In one example, a NetFlow version 5 record contains the following information about a packet flow:

Version number
Sequence number
Input and output interface indices used by SNMP (ifIndex in IF-MIB).
Timestamps for the flow start and finish time, in milliseconds since the last boot.
Number of bytes and packets observed in the flow
Layer 3 headers:
  a) Source & destination IP addresses
  b) Source and destination port numbers
  c) IP protocol
  d) Type of Service (ToS) value
for TCP flows, the union of all TCP flags observed over the life of the flow.

Layer 3 Routing information:
  a) IP address of the immediate next-hop (not the BGP nexthop) along the route to the destination
  b) Source & destination IP masks (prefix lengths in the CIDR notation).

In the packet flow monitoring used in the present invention, for each packet flow in the monitored traffic, the router reports the number of packets and bytes in the flow, the times of the first and last packets in the flow, and other information.

By combining network configuration information with information about the interface on which the packets arrived at a router and the outgoing interface on which the packets were transmitted, the previous and next hop routers for those packets may be determined.

Using Netflow information or other collected packet flow monitoring information, the present invention uses one of two alternative methods to infer the occurrence of a routing change in the network. Both methods gather information about the number of new flows observed on either an incoming or an outgoing interface at a router destined for a particular destination. Without loss of generality, a destination can refer to a single IP destination address, to an IP subnet, or to some other aggregate. The key requirement is that whatever flows constitute the destination be subject to the same routing behavior in the network (i.e., follow the same route or set of routes). That network information may be obtained out-of-band.

As indicated above, the methods may be applied by examining flows arriving at a router over a particular incoming interface or departing from a router over a particular outgoing interface. In what follows, the example of flows arriving at a router is used, again without loss of generality.

The methods are driven by the observation that a routing change which affects traffic to a destination will result in the absence of flows to that destination on links on the old route and the presence of flows to that destination on links on the new route.

For both methods, collected packet flow monitoring information is collected, and for each record, the time of the first observed packet in the flow and the incoming interface over which the flow was received are recorded.

Figure 2A:
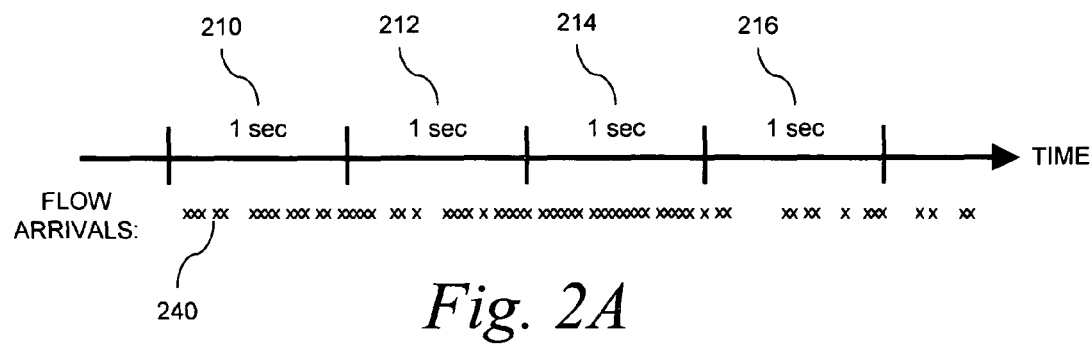
FIGS. 2A and 2B represent time lines showing methods for detecting changes in flow arrivals according to one embodiment of the invention.

The first method, in which flow arrivals are binned, is illustrated in FIG. 2A. In the binned flow arrival method, for an incoming interface, flow arrivals 240 are binned into time intervals such as intervals 210, 212, 214, 216 having a fixed length; for example, the bins may be 1 second. The number of flow arrivals per interval is counted and recorded. The number of arrivals will vary randomly due to the statistical nature of network traffic. For example, bin 214 has slightly more flow arrivals than bin 210 or bin 212 due to random variation.

Routing changes, however, (either at the router in question or at other routers) will manifest themselves as significant shifts in traffic, which will cause the number of new flow arrivals to either increase or decrease significantly. For example, bin 220 has statistically significantly fewer flow arrivals than bins 210, 212 and 214. Because that decrease cannot be attributed to random variation, the method of the invention infers that a routing protocol change has taken place.

The determination that a shift of traffic rate at a link is significant is made by comparing the size of the shift with the type random variation of the links traffic. There are a number of standard methods for statistical anomaly detection than can be used for this purpose. One method is to use a time series model of a sequence of measured traffic rates to measure characteristics of the traffic rate; for example, the empirical mean and standard deviation may be used. Those quantities are used to model the likelihood of obtaining a given traffic rate. If the likelihood attributable to a subsequent observed traffic rate is smaller than some specified threshold, then the rate is deemed to be due to a shift in traffic rate, rather than inherent random variation. Note that such statistical models can automatically incorporate the effects of sampling of measurements, since their effect is built into the empirical model.

Figure 2B:
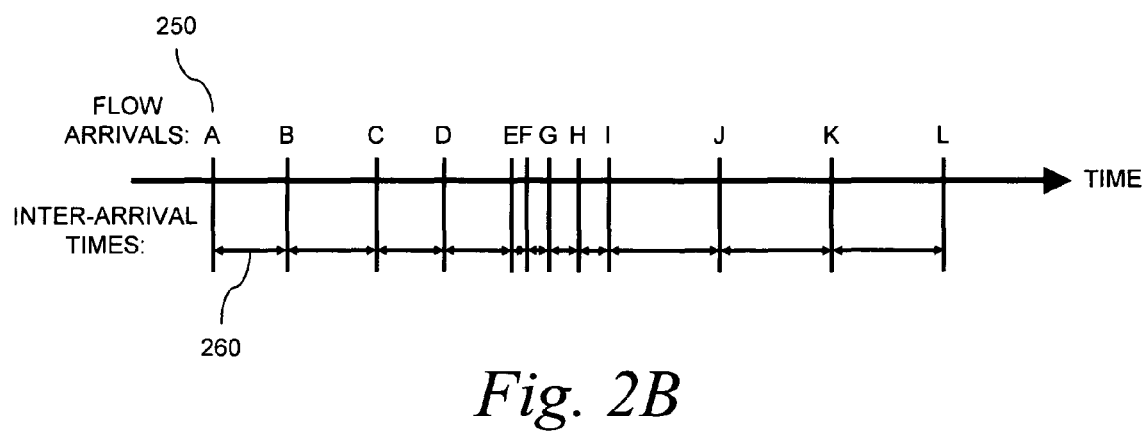

The second method, in which flow inter-arrival times are compared, is illustrated in FIG. 2B. In the flow inter-arrival process method, for an incoming interface, the statistical distribution of inter-arrival times 260 of new flow arrivals 250 is monitored. Routing changes are manifested in a significant change in this inter-arrival process. The average interval between new flow arrivals will increase or decrease significantly when a change is made in the routing protocol of the network. In the example shown in FIG. 2B, the inter-arrival times between flow arrivals A-B, B-C, C-D and D-E show only variation attributable to random variation in the network. After arrival E, however, there is a statistically significant decrease in arrival time, and after arrival I, there is a statistically significant increase in arrival time. Both events indicate a change in routing protocol in the network.

In both methods, a significant change in the number of new flow arrivals is detected. This change will indicate the occurrence of a routing change in the network. The event may be observable at a single router or at multiple routers. By examining changes across routers, the impact of a routing change can be determined, and the timing of when that change was realized at different routers can be determined.

Figure 3:
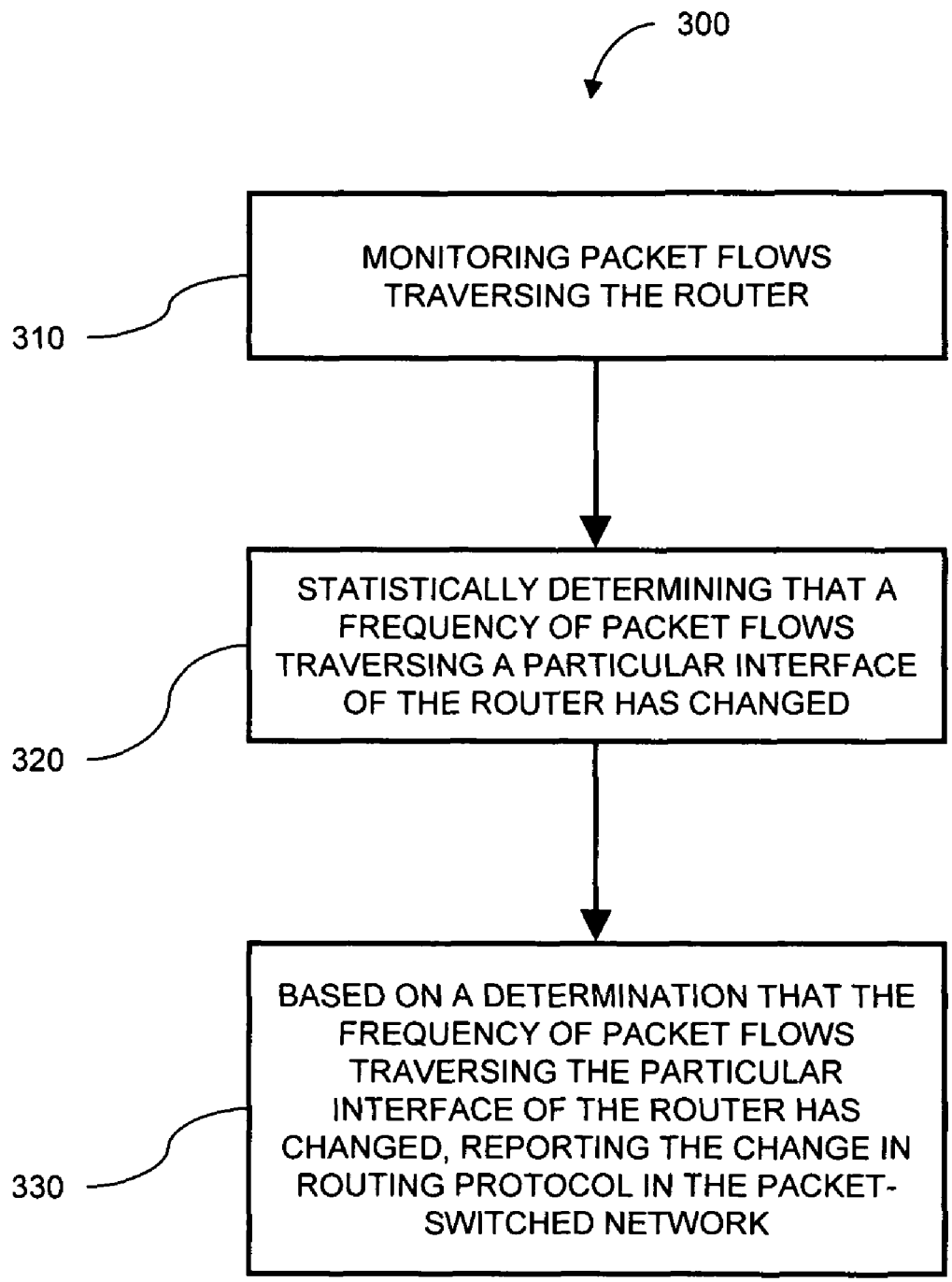
FIG. 3 is a flow chart showing a method according to one embodiment of the invention.

A method 300 according to the invention, as described above, is illustrated in the flow diagram of FIG. 3. The method, when performed in association with a router in a packet-switched network, is for detecting a change in routing protocol in the network.

Packet flows traversing the router are monitored (step 310) by a packet flow analyzer connected to the router. A packet flow is defined as a group of packets destined for the same destination. The monitored packet flows may all arrive at the same incoming interface of the router, or may all depart from the same outgoing interface.

In a computer connected for receiving data generated by the monitoring of the packet flows, it is statistically determined (step 320) that a frequency of packet flows traversing a particular interface of the router has changed. The determination may be made by observing numbers of flow arrivals per unit time, or may be made by observing inter-arrival times between flow arrivals.

Based on a determination that the frequency of packet flows traversing the particular interface of the router has changed, the change in routing protocol in the packet-switched network is reported (step 330). The determination is made statistically to distinguish indications of routing protocol changes from random variation in the network.

The solution of the invention provides information about the dynamics of routing protocols and the impact of those dynamics on the network. The solution makes it possible to identify when routing changes occur in the network and to understand the dynamic process by which multiple routers converge in a distributed manner following a routing change. For example, a second router may be monitored so that the impact of a network routing change may be better analyzed.

As such this method enables a much better understanding of the dynamics of routing protocols (i.e., how they converge) and the impact of these dynamics on the network.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein as utilizing the NetFlow measurement platform and its features, the method may be used with other packet flow measurement techniques. The described embodiments are merely illustrative of the principles of the present invention and various modifications may be implemented by those skilled in the art without departing from the scope and spirit of the invention.

What is claimed is:

1. A method for detecting routing changes in a packet-switched network, the method comprising:
   in a packet flow analyzer connected to a router, monitoring packet flows traversing the router, wherein all packets of a packet flow are destined for the same destination;
   in a computer connected for receiving data generated by the monitoring of the packet flows, statistically determining that a frequency of packet flows traversing a particular interface of the router has changed, including statistically detecting a decrease of flows to a particular destination; and
   based on a determination that the frequency of packet flows traversing the particular interface of the router has changed, reporting a removal of the router from a route to the particular destination.

2. The method of claim 1, wherein monitoring packet flows traversing the router comprises monitoring packets arriving at a particular incoming interface.

3. The method of claim 1, wherein monitoring packet flows traversing the router comprises monitoring packets departing over a particular outgoing interface.

4. The method of claim 1, wherein monitoring packet flows traversing the router comprises recording an observation time of a first packet of each monitored packet flow.

5. The method of claim 4, wherein monitoring packet flows traversing the router further comprises recording an interface traversed by each monitored packet flow.

6. The method of claim 1, wherein monitoring packet flows traversing the router further comprises recording a number of packet flows traversing the router during each of a plurality of time bins.

7. The method of claim 1, wherein monitoring packet flows traversing the router further comprises recording flow inter-arrival times between sequential packet flows traversing the router.

8. The method of claim 1, wherein the destination to which all packets of a packet flow are destined comprises a destination selected from the group consisting of an IP destination address, an IP subnet and a network aggregate.

9. The method of claim 1, wherein all packets of a packet flow have in common a source address and a destination address.

10. The method of claim 1, further comprising:
    repeating the monitoring and determining in association with a packet flow analyzer connected to a second router; and
    determining an impact on the packet-switched network of the removal of the router from the route.

11. A non-transitory computer-usable medium having computer readable instructions stored thereon for execution by a processor to perform a method for detecting routing changes in a packet-switched network, the method comprising:
    in a packet flow analyzer connected to a router, monitoring packet flows traversing the router, wherein all packets of a packet flow are destined for the same destination;

in a computer connected for receiving data generated by the monitoring of the packet flows, statistically determining that a frequency of packet flows traversing a particular interface of the router has changed, including statistically detecting a decrease of flows to a particular destination; and based on a determination that the frequency of packet flows traversing the particular interface of the router has changed, reporting a removal of the router from a route to the particular destination.

12. The non-transitory computer-usable medium of claim 11, wherein monitoring packet flows traversing the router comprises monitoring packets arriving at a particular incoming interface.

13. The non-transitory computer-usable medium of claim 11, wherein monitoring packet flows traversing the router comprises monitoring packets departing over a particular outgoing interface.

14. The non-transitory computer-usable medium of claim 11, wherein monitoring packet flows traversing the router comprises recording an observation time of a first packet of each monitored packet flow.

15. The non-transitory computer-usable medium of claim 14, wherein monitoring packet flows traversing the router further comprises recording an interface traversed by each monitored packet flow.

16. The non-transitory computer-usable medium of claim 11, wherein monitoring packet flows traversing the router further comprises recording a number of packet flows traversing the router during each of a plurality of time bins.

17. The non-transitory computer-usable medium of claim 11, wherein monitoring packet flows traversing the router further comprises recording flow inter-arrival times between sequential packet flows traversing the router.

18. The non-transitory computer-usable medium of claim 11, wherein the destination to which all packets of a packet flow are destined comprises a destination selected from the group consisting of an IP destination address, an IP subnet and a network aggregate.

19. The non-transitory computer-usable medium of claim 11, wherein all packets of a packet flow have in common a source address and a destination address.

20. The non-transitory computer-usable medium of claim 11, wherein the method further comprises:
repeating the monitoring and determining in association with a packet flow analyzer connected to a second router; and
determining an impact on the packet-switched network of the removal of the router from the route.

* * * * *